(12) United States Patent
Ueda

(10) Patent No.: US 6,684,009 B2
(45) Date of Patent: Jan. 27, 2004

(54) ARRAYED WAVEGUIDE GRATING AND MULTIPLEXER/DEMULTIPLEXER SYSTEM AND MULTIPLEXER/DEMULTIPLEXER DEVICE USING THEREOF

(75) Inventor: Tetsuji Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 11 days.

(21) Appl. No.: 09/891,414

(22) Filed: Jun. 27, 2001

(65) Prior Publication Data

US 2002/0001432 A1 Jan. 3, 2002

(30) Foreign Application Priority Data

Jun. 28, 2000 (JP) .......................................... 2000-200106

(51) Int. Cl.[7] ................................................ G02B 6/34
(52) U.S. Cl. .......................................... 385/37; 385/129
(58) Field of Search ................................ 385/129–130, 385/37

(56) References Cited

U.S. PATENT DOCUMENTS

| | | | | |
|---|---|---|---|---|
| 5,748,811 A | * | 5/1998 | Amersfoort et al. | 385/15 |
| 6,049,640 A | * | 4/2000 | Doerr | 385/15 |
| 6,272,270 B1 | * | 8/2001 | Okayama | 385/46 |
| 6,282,344 B1 | * | 8/2001 | Bergmann et al. | 385/17 |
| 6,456,758 B1 | * | 9/2002 | Anthony | 385/27 |
| 6,529,649 B1 | * | 3/2003 | Soole | 385/14 |
| 2002/0015554 A1 | * | 2/2002 | Oguma et al. | 385/24 |

FOREIGN PATENT DOCUMENTS

JP 2001-051136 2/2001

OTHER PUBLICATIONS

Japanese Office Action dated Jul. 9, 2003 with partial English translation.

* cited by examiner

Primary Examiner—Edward J. Glick
Assistant Examiner—Krystyna Suchecki
(74) Attorney, Agent, or Firm—McGinn & Gibb, PLLC

(57) ABSTRACT

An arrayed waveguide grating of the present invention comprises a first circuit A and a second circuit B. When multiplexed lights are inputted from a fiber array which is connected to input/output waveguides at multiplex side, the multiplexed lights propagate through the input/output waveguides at multiplex side, and are outputted to a slab waveguides at multiplex side. The outputted multiplexed lights are spread in a radial pattern and inputted to an arrayed waveguide group by equally segmented optical power, and then outputted to slab waveguides at demultiplex side being provided with phase shift at the fixed difference in length. Demultiplexed lights outputted to the core of input/output waveguides at demultiplex side, generating a multiple beam diffraction interference at the slab waveguides at demultiplex side, are outputted into an optical fiber of a tape fiber by the fiber array. Consequently, miniaturization and lowering the price are realized, and there will be less limitation in the mounting space and the mounting position.

36 Claims, 7 Drawing Sheets

TRANSMISSION SIDE          RECEPTION SIDE

ARRAYED WAVEGUIDE GRATING AND MULTIPLEXER/DEMULTIPLEXER SYSTEM AND MULTIPLEXER/DEMULTIPLEXER DEVICE USING THEREOF

BACKGROUND OF THE INVENTION

The present invention relates to an AWG (arrayed waveguide grating) that is applied to an optical communication device and used in multiplexing/demultiplexing communication lights of different wavelength, and the present invention relates to an optical multiplex/demultiplex system and an optical multiplexer/demultiplexer using the AWG.

DESCRIPTION OF THE RELATED ART

The AWG is a waveguide diffraction grating which utilizes the phase difference made by the difference of optical path length between arrayed waveguides. In the following, the principle of the AWG will be explained in comparison with a prior art.

In the conventional diffraction grating type demultiplexer, incident lights of different wavelength inputted to a diffraction grating from an input optical fiber are separated into the respective wavelength by the angles. Then, the angles of the wavelengths are converted into variations of positions by an optical lens and converged to an output optical fiber. In this way, in the prior art diffraction grating, a wavelength dispersion has been realized by an interference effect created by the phase difference owing to the periodic structure of the grating.

On the other hand, in the AWG of the present invention, a plurality of channel waveguides are provided with a fixed deviation of the optical path length, and an interference effect created at the output ends realizes segmentation of the lights according to the angle of the respective wavelengths. As the optical element which is equivalent to the optical lens of the prior art diffraction grating type demultiplexer, in the AWG of the present invention, a fan-shape slab waveguide is used, in which a plurality of channel waveguides are positioned in an arc shape.

In the above-mentioned fan-shape slab waveguide, arrayed input/output waveguide groups and an arrayed waveguide group are positioned in an arc shape, keeping a fixed distance from each other. The curvature center of the fan-shape slab waveguide is positioned at an arrayed input/output waveguide group, and an arrayed waveguide is positioned in a radial pattern so that the optical axis goes through the curvature center. Since there is no horizontal optical confinement in a slab waveguide, lights outputted from one input waveguide are spread out in a radial pattern by diffraction, and an arrayed waveguide group of the AWG is driven at the same phase. The arrayed waveguide group of the AWG is composed of a plurality of channel waveguides which are separated from each other having a difference ($\Delta L$) in length. The difference ($\Delta L$) in length causes a constant amount of phase shift at the output ends of the arrayed waveguides, and the interference effect created by the phase shift brings about a dispersion of the wavelength.

FIG. 1 is a plane view showing a construction of a prior art AWG. Referring to FIG. 1, the principle of the AWG will be explained taking a demultiplexing operation as an example. In FIG. 1, the conventional AWG comprises an input waveguide 121, an input-side slab waveguide 122, an arrayed waveguide group 123, an output-side slab waveguide 124, an output waveguide 125 on a waveguide substrate 120. An input fiber array 126 is connected to the input waveguide 121, and an output fiber array 127 to the output waveguide 125.

Multiplexed lights $\lambda_1$ to $\lambda n$ go through a single fiber 128 and the input fiber array 126, and are made incident into the input waveguide 121. The multiplexed lights $\lambda_1$ to $\lambda n$ are spread in a radial pattern by the input-side slab waveguide 122 and segmented to the arrayed waveguide group 123 at the same phase at almost the same photon quantities. The arrayed waveguide group 123 is composed of a plurality of waveguides, and each of them has a difference ($\Delta L$) in length. When the multiplexed lights $\lambda_1$ to $\lambda n$ propagate through the arrayed waveguide group 123, the optical phase difference is created. Undergoing a multiple beam diffraction interference at the output-side slab waveguide 124, the multiplexed lights $\lambda_1$ to $\lambda n$ are converged at the output waveguide 125 corresponding to each wavelength, and thus demultiplex is realized. The demultiplexed lights $\lambda_1$ to $\lambda n$ outputted to each of the output waveguides 125 go through the output fiber array 127 and are outputted to a tape fiber 129. The demultiplexed lights $\lambda_1$ to $\lambda n$ have a wavelength profile with a center wavelength which causes loss at a minimum level.

One of the prominent characters of the AWG is to be able to design the specific character freely by such as making appropriate selection of the length of arrayed waveguides or the space between them. Up to this point, a variety of multiplexers/demultiplexers with the AWG have been realized by utilizing such materials as a siliceous material, a semiconductor and a polymer.

FIG. 2 is a sectional view of a module structure provided with the conventional AWG. In FIG. 2, a module 130 includes at the lower layer within a case 131, a temperature controlling device (i.e., a peltier device) 132, an AWG element 133, a temperature detecting device (i.e., a thermistor device) 134, an input fiber array 135, an output fiber array 136 (fiber arrays 135 and 136 are positioned at both ends of the AWG element), a single fiber 137 and a tape fiber 138, and at the upper part a cover 139. According to the module structure shown in FIG. 2, the single fiber 137 and the tape fiber 138 are extended from the both ends of the module comprising the case 131 and the cover 139.

Recently, in optical communication network, an optical communication device has come into use for network nodes which perform not only simple point-to-point transmission, but also circuit switching and input/output of signals. Thus, the optical communication device for structuring a network with larger capacity, higher flexibility and reliability has become essential.

In particular, a demand for the AWG as an optical communication device of the sort is rapidly increased in accordance with multiplexing and increase in the number of wavelength in the optical communication system. Consequently, it is urgently required to have a miniaturized AWG with the lower price.

However, the above-mentioned conventional AWG has some problems as follows. First of all, since an element is enlarged due to increase in the number of wavelengths, quantity of elements which can be obtained from one wafer is decreased. Secondly, since characteristic dispersion occurs due to increase in the number of wavelengths, non-defective ratio is lowered, that is a yielding percentage (non-defective products/gross product) is deteriorated. Thirdly, since an optical communication system has become highly efficient and the AWG has been required to have high specifications, it is hard to secure a non-defective AWG. Furthermore, as is apparent from the above-mentioned structure of a module, since a single fiber and a tape fiber are extended from the both ends of the module, there are increase in the mounting area and a limitation in the mounting position.

SUMMARY OF THE INVENTION

Accordingly, it is an object of the present invention to provide an AWG, an optical multiplex/demultiplex system and an optical multiplexer/demultiplexer with the AWG, which realize miniaturization and lowering the price, as well as, have less limitation in the mounting space and position.

In other words, the present invention provides an AWG, an optical multiplex/demultiplex system and an optical multiplexer/demultiplexer with the AWG, which realize miniaturization and lowering the price, by composing a plurality of selective circuits within one element, and converging input/output waveguides of both multiplex side and demultiplex side at given one side of the element.

In order to achieve the above object, an AWG in accordance with the first aspect of the present invention is structured by forming multiple waveguides on a substrate, and has a plurality of selective circuits.

In accordance with the second aspect of the present invention, in the first aspect, input ends and output ends of each of the multiple circuits are disposed on an arbitrary side of a substrate.

In accordance with the third aspect of the present invention, in the second aspect, the input ends and output ends are adjacently disposed at one side of the substrate.

In accordance with the fourth aspect of the present invention, in the second or the third aspect, the input ends and output ends of each of the multiple circuits are disposed at any two sides of the substrate respectively.

In accordance with the fifth aspect of the present invention, in the fourth aspect, the input ends and output ends of each of the multiple circuits are disposed at any two opposite sides of the substrate respectively.

In accordance with the sixth aspect of the present invention, in the fourth aspect, the input ends and output ends of each of the multiple circuits are disposed at any two adjacent sides of the substrate respectively.

In accordance with the seventh aspect of the present invention, in one of the aspects first to sixth, the AWG selects and uses one of the multiple circuits.

In accordance with the eighth aspect of the present invention, in one of the aspects first to seventh, a plurality of the circuits are composed of a first circuit and a second circuit.

In accordance with the ninth aspect of the present invention, in the eighth aspect, the first circuit comprises first input/output waveguides at multiplex side, a first slab waveguide at multiplex side, second input/output waveguides at demultiplex side, a second slab waveguide at demultiplex side and a first arrayed waveguide group connecting the first slab waveguide and the second slab waveguide.

In accordance with the tenth aspect of the present invention, in the eighth aspect or the ninth aspect, the second circuit comprises third input/output waveguides at multiplex side, a third slab waveguide at multiplex side, fourth input/output waveguides at demultiplex side, a fourth slab waveguide at demultiplex side and a second arrayed waveguide group connecting the third slab waveguide and the fourth slab waveguide.

In accordance with the eleventh aspect of the present invention, in the tenth aspect, on the substrate the first slab waveguide and the third slab waveguide are intersected, and the second slab waveguide and the fourth slab waveguide are intersected.

In accordance with the twelfth aspect of the present invention, in the eleventh aspect, the cross-point of the first slab waveguide and the third slab waveguide and the cross-point of the second slab waveguide and the fourth slab waveguide are positioned on the substrate, wherein the two cross-points form a line symmetry whose axis is the line segment combining the center points of the first arrayed waveguide group and the second arrayed waveguide group.

In accordance with the thirteenth aspect of the present invention, in one of the aspects tenth to twelfth, the ends of the first input/output waveguides and the second input/output waveguides and the ends of the third input/output waveguides and the fourth input/output waveguides are positioned at an arbitrary side of the substrate.

In accordance with the fourteenth aspect of the present invention, in the thirteenth aspect, the ends of the first input/output waveguides and the second input/output waveguides and the ends of the third input/output waveguides and the fourth input/output waveguides are adjacently positioned at an arbitrary side of the substrate respectively.

In accordance with the fifteenth aspect f the present invention, in one of the aspects tenth to fourteenth, the ends of the first input/output waveguides and the second input/output waveguides and the ends of the third input/output waveguides and the fourth input/output waveguides are positioned at any two sides of the substrate respectively.

In accordance with the sixteenth aspect of the present invention, in one of the aspects tenth to fifteenth, the ends of the first input/output waveguides and the second input/output waveguides and the ends of the third input/output waveguides and the fourth input/output waveguides are positioned at any two opposite sides of the substrate respectively.

In accordance with the seventeenth aspect of the present invention, in one of the aspects tenth to fifteenth, the ends of the first input/output waveguides and the second input/output waveguides and the ends of the third input/output waveguides and the fourth input/output waveguides are positioned at any two adjacent sides of the substrate respectively.

In accordance with the eighteenth aspect of the present invention, in one of the aspects first to seventh, a plurality of the circuits are composed of a first circuit, a second circuit, a third circuit and a fourth circuit.

In accordance with the nineteenth aspect of the present invention, in the eighteenth aspect, the first circuit comprises first input/output waveguides at multiplex side, a first slab waveguide at multiplex side, second input/output waveguides at demultiplex side, a second slab waveguide at demultiplex side and a first arrayed waveguide group connecting the first slab waveguide and the second slab waveguide.

In accordance with the twentieth aspect of the present invention, in the eighteenth or the nineteenth aspect, the second circuit comprises third input/output waveguides at multiplex side, a third slab waveguide at multiplex side, fourth input/output waveguides at demultiplex side, a fourth slab waveguide at demultiplex side and a second arrayed waveguide group connecting the third slab waveguide and the fourth slab waveguide.

In accordance with the twenty-first aspect of the present invention, in one of the aspects eighteenth to twentieth, the third circuit comprises fifth input/output waveguides at multiplex side, a fifth slab waveguide at multiplex side, sixth input/output waveguides at demultiplex side, a sixth slab waveguide at demultiplex side and a third arrayed waveguide group connecting the fifth slab waveguide and the sixth slab waveguide.

In accordance with the twenty-second aspect of the present invention, in one of the aspects eighteenth to twenty-first, the fourth circuit comprises seventh input/output waveguides at multiplex side, a seventh slab waveguide at multiplex side, eighth input/output waveguides at demultiplex side, a eighth slab waveguide at demultiplex side and a fourth arrayed waveguide group connecting the seventh slab waveguide and the eighth slab waveguide.

In accordance with the twenty-third aspect of the present invention, in the twenty-second aspect, on the substrate the first slab waveguide, the third slab waveguide, the fifth slab waveguide and the seventh slab waveguide are intersected, and the second slab waveguide, the fourth slab waveguide, the sixth slab waveguide and the eighth slab waveguide are intersected.

In accordance with the twenty-fourth aspect of the present invention, in the twenty-third aspect, the cross-point of the first slab waveguide, the third slab waveguide, the fifth slab waveguide and the seventh slab waveguide and the cross-point of the second slab waveguide, the fourth slab waveguide, the sixth slab waveguide and the eighth slab waveguide are positioned on the substrate, and the two cross-points form a line symmetry whose axis is the line segment combining the respective center points of the first arrayed waveguide group, the second arrayed waveguide group, the third arrayed waveguide group and the fourth arrayed waveguide group.

In accordance with the twenty-fifth aspect of the present invention, in one of the aspects twenty-second to twenty-fourth, the ends of the first input/output waveguides and the second input/output waveguides, the ends of the third input/output waveguides and the fourth input/output waveguides, the ends of the fifth input/output waveguides and the sixth input/output waveguides and the ends of the seventh input/output waveguides and the eighth input/output waveguides are positioned at an arbitrary side of the substrate respectively.

In accordance with the twenty-sixth aspect of the present invention, in the twenty-fifth aspect, the ends of the first input/output waveguides and the second input/output waveguides, the ends of the third input/output waveguides and the fourth input/output waveguides, the ends of the fifth input/output waveguides and the sixth input/output waveguides and the ends of the seventh input/output waveguides and the eighth input/output waveguides are adjacently positioned at an arbitrary side of the substrate respectively.

In accordance with the twenty-seventh aspect of the present invention, in one of the aspects twenty-second to twenty-sixth, the ends of the first input/output waveguides and the second input/output waveguides, the ends of the third input/output waveguides and the fourth input/output waveguides, the ends of the fifth input/output waveguides and the sixth input/output waveguides and the ends of the seventh input/output waveguides and the eighth input/output waveguides are positioned at any two sides of the substrate respectively.

In accordance with the twenty-eighth aspect of the present invention, in one of the aspects twenty-second to twenty-seventh, the ends of the first input/output waveguides and the second input/output waveguides, the ends of the third input/output waveguides and the fourth input/output waveguides, the ends of the fifth input/output waveguides and the sixth input/output waveguides and the ends of the seventh input/output waveguides and the eighth input/output waveguides are positioned at any two opposite sides of the substrate respectively.

In accordance with the twenty-ninth aspect of the present invention, in one of the aspects twenty-second to twenty-seventh, the ends of the first input/output waveguides and the second input/output waveguides, the ends of the third input/output waveguides and the fourth input/output waveguides, the ends of the fifth input/output waveguides and the sixth input/output waveguides and the ends of the seventh input/output waveguides and the eighth input/output waveguides are positioned at any two adjacent sides of the substrate respectively.

In accordance with the thirtieth aspect of the present invention, there is provided an optical communication system constructed with the AWG in one of the aspects first to twenty-ninth.

In accordance with the thirty-first aspect of the present invention, there is provided an optical multiplexer/demultiplexer constructed with the AWG in one of the aspects first to twenty-ninth.

The present invention relates to the AWG which is applied to an optical network node in an optical communication system, comprising a plurality of selective circuits as a device which multiplexes or demultiplexes communication lights with different wavelengths. In the AWG, the core end faces of input ends and output ends of the circuits are converged at an arbitrary side of a substrate.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

A description is given in detail of an AWG according to preferred embodiments of the present invention with reference to the accompanying drawings. The drawings of FIGS. 3 to 13 illustrate the embodiments of the AWG of the present invention.

First Embodiment

Figure 3:
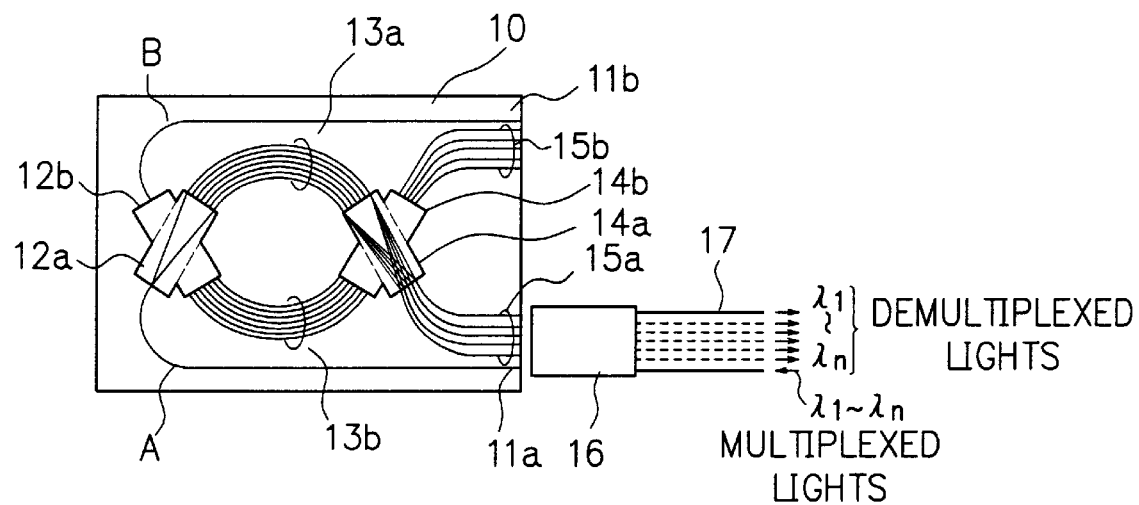
FIG. 3 is a plan view showing a schematic construction of the AWG according to a first embodiment of the present invention.

FIG. 3 is a plan view showing a schematic construction of the AWG according to a first embodiment of the present invention. An AWG device according to the first embodiment of the present invention comprises a first circuit A and a second circuit B on a waveguide substrate 10.

The first circuit A comprises input/output waveguides at multiplex side 11a, a slab waveguide at multiplex side 12a, an arrayed waveguide group 13a, a slab waveguide at demultiplex side 14a and input/output waveguides at demultiplex side 15a.

The second circuit B, in the same way as the above-mentioned circuit A, comprises input/output waveguides at multiplex side 11b, a slab waveguide at multiplex side 12b, an arrayed waveguide group 13b, a slab waveguide at demultiplex side 14b and input/output waveguides at demultiplex side 15b.

The input/output waveguides at multiplex side 11a and the input/output waveguides at demultiplex side 15a of the first circuit A, and the input/output waveguides at multiplex side 11b and the input/output waveguides at demultiplex side 15b of the second circuit B, in order to propagate transmission lights from a fiber array 16, converge the core end faces at the right side of the waveguide substrate 10 (e.g. at right side in FIG. 3).

One side of the slab waveguide at multiplex side 12a is optically connected to the input/output waveguides at multiplex side 11a and the other side is to the arrayed waveguide group 13a. Further, one side of the slab waveguide at demultiplex side 14a is optically connected to the input/output waveguides at demultiplex side 15a and the other side to the arrayed waveguide group 13a.

The slab waveguide at multiplex side 12a has a plane core-shape so that transmission lights are spread out in a radial pattern in parallel with the waveguide substrate 10.

The arrayed waveguide group 13a is composed of a plurality of optical waveguides which have a difference in length each other, connecting the slab waveguide at multiplex side 12a with the slab waveguide at demultiplex side 14a. The difference is usually considered as ΔL, however the value is not always fixed. Sometimes, the value of ΔL is revised in order to have a further broadband demultiplex property.

The slab waveguide at demultiplex side 14a being connected to the arrayed waveguide group 13a, and the slab waveguide at multiplex side 12a basically form a line symmetry whose axis is formed by connecting the central points of the arrayed waveguide groups 13a and 13b. In the same way as the slab waveguide at multiplex side 12a, the slab waveguide at demultiplex side 14a has a plane core-shape and is connected to the input/output waveguides at demultiplex side 15a comprising a plurality of optical waveguides.

Further, the slab waveguide at multiplex side 12a, the slab waveguide at demultiplex side 14a, the input/output waveguides at multiplex side 11a, the input/output waveguides at demultiplex side 15a and the arrayed waveguide group 13a are located in relation to be connecting on a parallel with the waveguide substrate 10, and they are formed on a basis of a multiple beam diffraction interference which realizes a multiplex/demultiplex function.

The second circuit B has the same construction as the first circuit A. The first circuit A and the second circuit B are integrated by intersecting the slab waveguides at multiplex side 12a and 12b, and the slab waveguides at demultiplex side 14a and 14b respectively.

The fiber array 16 is used to optically connect a tape fiber(s) 17 and either the first circuit A or the second circuit B, whereof selection is made based on a standard of optical characteristics (i.e., insertion loss, polarization dependent loss, cross talk). For instance, when the first circuit A meets a standard of optical characteristic(s), the first circuit A is connected to the fiber array 16 in which the core end faces of the tape fiber(s) 17 is(are) arrayed to correspond with the pitch interval of the input/output waveguides at multiplex side 11a and the input/output waveguides at demultiplex side 15a of the first circuit A.

Next, referring to FIG. 3, a description is given of demultiplexing operation of the AWG according to the first embodiment of the present invention. As is apparent from FIG. 3 the multiplexed lights $\lambda_1$ to $\lambda_n$ whose wavelengths are multiplexed and divided, are inputted to an AWG device from the fiber array 16 including the tape fiber(s) 17.

The inputted multiplexed lights $\lambda_1$ to λn propagate through the input/output waveguides at multiplex side 11a and are outputted to the slab waveguide at multiplex side 12a. Then, the outputted multiplexed lights $\lambda_1$ to λn are spread in a radial pattern and inputted to each waveguide of the arrayed waveguide group 13a by optical power which is equally segmented. Propagating through the arrayed waveguide group 13a provided with the fixed difference (ΔL) in length of its waveguides, the multiplexed lights $\lambda_1$ to λn are given phase shift, and then outputted to the slab waveguides at demultiplex side 14a.

The multiplexed lights $\lambda_1$ to λn outputted to the slab waveguides at demultiplex side 14a generate a multiple beam diffraction interference, and are inputted into the core of the input/output waveguides at demultiplex side 15a which is disposed at the position where demultiplexed lights of each wavelength converge. Each of the demultiplexed lights $\lambda_1$ to λn propagates through the input/output waveguides 15a and is outputted into each optical fiber of the tape fibers 17 which are optically connected by the fiber array 16.

As mentioned above, demultiplexing operation is described as an example. In case of multiplexing operation, multiplex is realized by going through the opposite procedure of demultiplexing operation.

Additionally, although the above explanation refers to only the case of using the first circuit A, multiplexing and demultiplexing operations with the second circuit B are also to be realized in the same way as with the first circuit A. In case of using the second circuit B, the fiber array 16 is to be connected to the second circuit B in the way that the core of the tape fibers 17 are arrayed to correspond with the pitch interval of the input/output waveguides at multiplex side 11b and the input/output waveguides at demultiplex side 15b.

Figure 4:
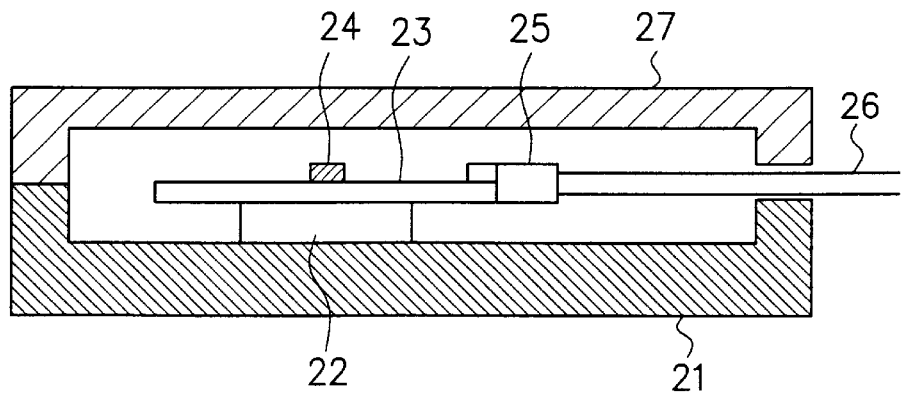
FIG. 4 is a sectional view showing a module structure provided with the AWG according to the first embodiment of the present invention.

FIG. 4 is a sectional view showing a module structure provided with the AWG according to a first embodiment of the present invention. In FIG. 4, a module 20 includes from the lower layer in a case 21, a temperature controlling device (i.e., a peltier device) 22, an AWG element 23, a temperature detecting device (i.e., a thermistor device) 24, a fiber array 25 provided at the right side of the AWG element and a tape fiber 26, and at the upper part a cover 27.

Figure 1:
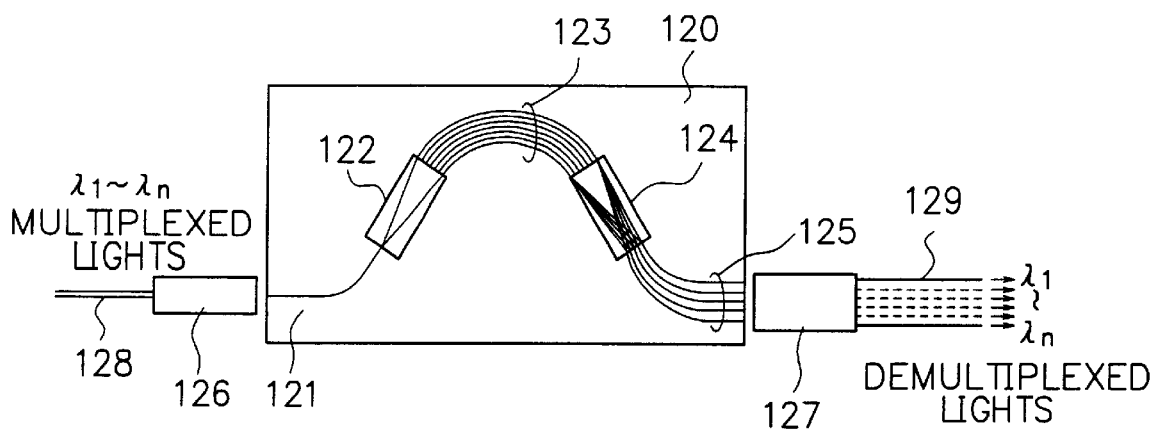
FIG. 1 is a plan view showing a schematic construction of the conventional AWG.
Figure 2:
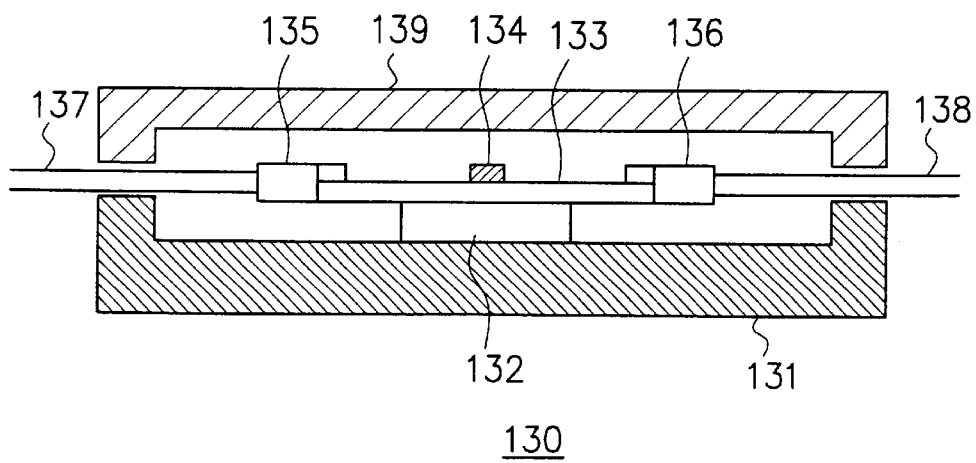
FIG. 2 is a sectional view showing a module structure provided with the conventional AWG.

According to the module structure provided with the AWG according to the first embodiment of the present invention, the tape fiber 26 is extended from only the right side of the module composed of the case 21 and the cover 27. Thus, as is apparent from the comparison with the conventional module structure shown in FIG. 2, by miniaturizing the module itself, the mounting area is to be reduced and there is less limitation in the mounting position. As a result, it is made possible to mount the module on such places as a triangular corner and a blind alley.

Second Embodiment

Figure 5:
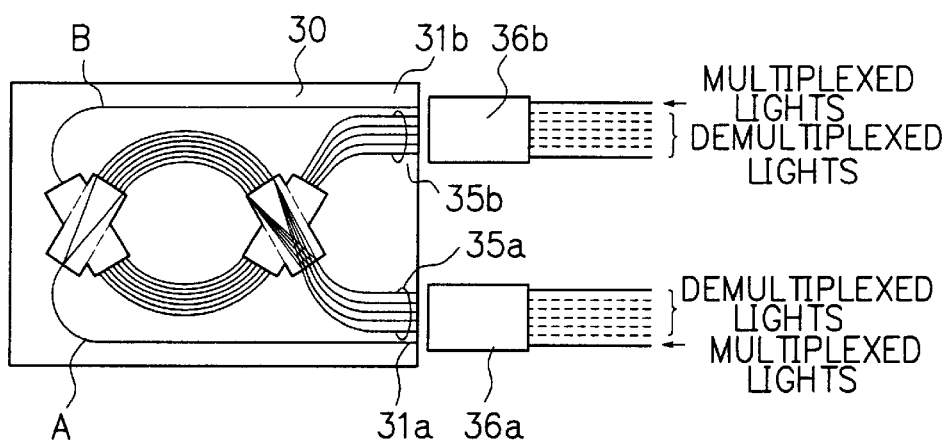
FIG. 5 is a plan view showing a schematic construction of the AWG according to a second embodiment of the present invention.

FIG. 5 is a plan view showing a schematic construction of the AWG according to a second embodiment of the present invention. As shown in FIG. 5, the AWG according to the second embodiment of the present invention is basically same as the AWG according to the first embodiment of the present invention. In this embodiment, the case that both first circuit A and second circuit B on a waveguide substrate 30 meet a standard of optical characteristics will be explained.

As shown in FIG. 5, input/output waveguides at multiplex side 31a and input/output waveguides at demultiplex side 35a of the first circuit A are connected to a fiber array 36a, and input/output waveguides at multiplex side 31b and input/output waveguides at demultiplex side 35b of the second circuit B are connected to a fiber array 36b.

According to the second embodiment of the present invention, when the arbitrary optical characteristics of each first circuit A and second circuit B on the waveguide substrate 30 are up to the standard, those two circuits are to be used at the same time. Further, since the input/output waveguides at multiplex side 31a and the input/output waveguides at demultiplex side 35a of the first circuit A, and the input/output waveguides at multiplex side 31b and the input/output waveguides at demultiplex side 35b of the second circuit B are respectively constructed on an arbitrary side of the waveguide substrate 30, by miniaturizing the module structure, the mounting space is to be reduced and there is less limitation in the mounting position.

In addition, according to the second embodiment of the present invention, production cost is considerably reduced by constructing two available circuits on one substrate.

Further, according to the second embodiment of the present invention, since fiber arrays corresponding to two modules can be extended from one side of a waveguide substrate, only the mounting space for extending fiber arrays corresponding to one module is required, and thus reduction in the mounting space is realized.

Third Embodiment

Figure 6:
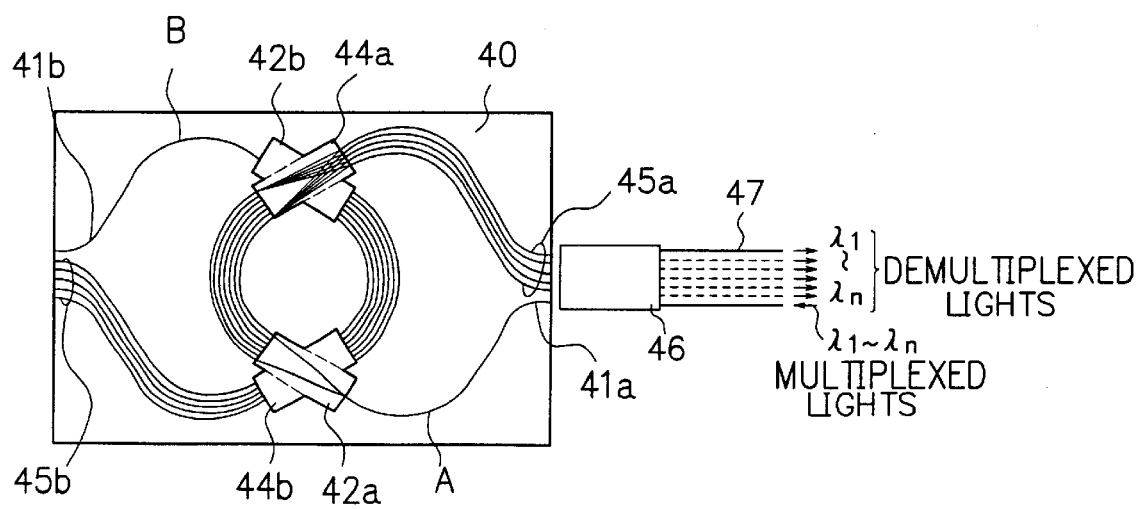
FIG. 6 is a plan view showing a schematic construction of the AWG according to a third embodiment of the present invention.

FIG. 6 is a plan view showing a schematic construction of the AWG according to a third embodiment of the present invention. As shown in FIG. 6, the AWG according to the third embodiment of the present invention comprises a first circuit A and a second circuit B on a waveguide substrate 40 in the same way as that of the first embodiment. In this embodiment, core end faces of input/output waveguides at multiplex side 41a and input/output waveguides at demultiplex side 45a of the first circuit A are positioned at the right side of the waveguide substrate 40, and core end faces of input/output waveguides at multiplex side 41b and input/output waveguides at demultiplex side 45b of the second circuit B are positioned at the left side of the waveguide substrate 40.

Further, according to the third embodiment of the present invention, the first circuit A and the second circuit B are integrated by intersecting a slab waveguide at multiplex side 42a and a slab waveguides at demultiplex side 44a, and a slab waveguide at multiplex side 42b and a slab waveguides at demultiplex side 44b respectively. However, the mounting direction is different from the first embodiment by an angle of 90 degrees.

According to the third embodiment of the present invention, a fiber array 46 is used to optically connect a tape fiber(s) 47 and either the first circuit A or the second circuit B, whereof selection is made based on a standard of optical characteristics.

For instance, when the first circuit A meets a standard of optical characteristics, the first circuit A is connected to the fiber array 46 in which the core end face(s) of the tape fiber(s) 47 is(are) arrayed to correspond with the pitch interval of the input/output waveguides at multiplex side 41a and the input/output waveguides at demultiplex side 45a of the first circuit A from the right side of the waveguide substrate 40.

In the same manner, when the second circuit B meets a standard of optical characteristics, the second circuit B is connected to a fiber array (not shown in FIG. 6) in which the core end face(s) of the tape fiber(s) is(are) arrayed to correspond with the pitch interval of the input/output waveguides at multiplex side 41b and the input/output waveguides at demultiplex side 45b of the second circuit B from the left side of the waveguide substrate 40.

As described above, the selection of either the first circuit A or the second circuit B is made depending on whether they meet a standard of optical characteristics. Furthermore, as shown in FIG. 6, when input/output waveguides (41a and 45a, 41b and 45b) for each circuit are formed at both sides of the waveguide substrate 40, and one of the two circuits is selected and used, only one side of mounting space of the fiber array 47 is to be used.

According to the third embodiment of the present invention, the input/output waveguides (41a and 45a, 41b and 45b) of the first circuit A and the second circuit B on one element, are formed at opposite sides of the waveguide substrate 40. By using one of the two circuits selected by a standard of optical characteristics, the AWG according to the third embodiment of the present invention has less limitation in the mounting position.

Further, according to the third embodiment of the present invention, since the first circuit A and the second circuit B form a point symmetry whose point is the element or the waveguide substrate 40, the shape after construction of the AWG is to be the same regardless of which circuit is to be selected.

Fourth Embodiment

Figure 7:
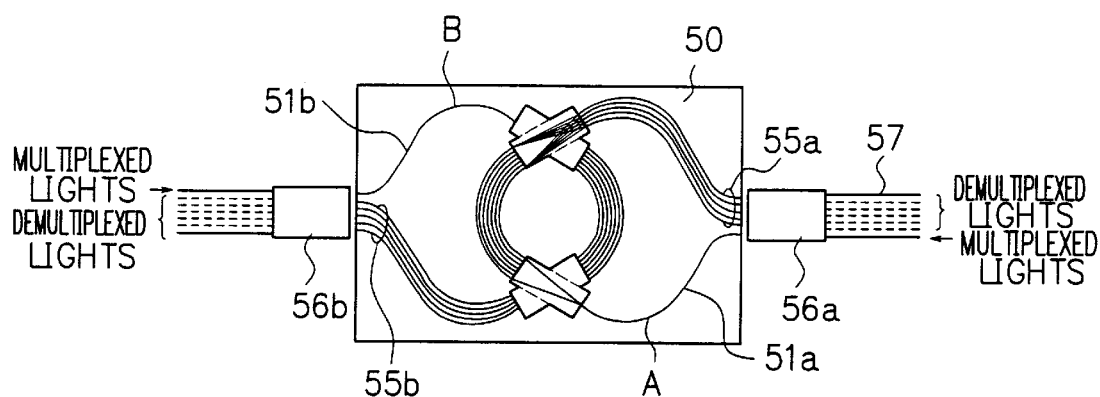
FIG. 7 is a plan view showing a schematic construction of the AWG according to a fourth embodiment of the present invention.

FIG. 7 is a plan view showing a schematic construction of the AWG according to a fourth embodiment of the present invention. As shown in FIG. 7, the AWG according to the fourth embodiment of the present invention is basically same as the AWG according to the third embodiment of the present invention. In this embodiment, the case that both first circuit A and second circuit B on a waveguide substrate 50 meet a standard of optical characteristics will be explained.

As shown in FIG. 7, input/output waveguides at multiplex side 51a and input/output waveguides at demultiplex side 55a of the first circuit A are connected to a fiber array 56a, and input/output waveguides at multiplex side 51b and input/output waveguides at demultiplex side 55b of the second circuit B are connected to a fiber array 56b.

According to the fourth embodiment of the present invention, when the arbitrary optical characteristics of each first circuit A and second circuit B on the waveguide substrate 50 are up to the standard, those two circuits are to be used at the same time.

In addition, according to the fourth embodiment of the present invention, production cost is considerably reduced by constructing two available circuits on one element.

Fifth Embodiment

Figure 8:
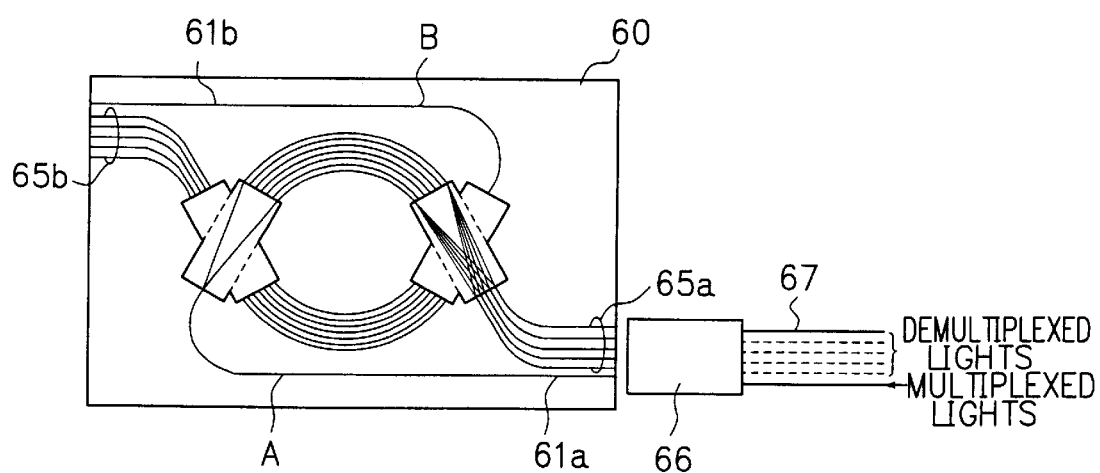
FIG. 8 is a plan view showing a schematic construction of the AWG according to a fifth embodiment of the present invention.

FIG. 8 is a plan view showing a schematic construction of the AWG according to a fifth embodiment of the present invention. As shown in FIG. 8, the AWG according to the fifth embodiment of the present invention comprises a first circuit A and a second circuit B on a waveguide substrate 60 in the same way as the AWG according to the first embodiment of the present invention. In this embodiment, core end faces of input/output waveguides at multiplex side 61a and input/output waveguides at demultiplex side 65a of the first circuit A are positioned at the bottom right of the waveguide substrate 60, and core end faces of input/output waveguides at multiplex side 61b and input/output waveguides at demultiplex side 65b of the second circuit B are positioned at the upper left of the waveguide substrate 60.

According to the fifth embodiment of the present invention, a fiber array 66 is used to optically connect a tape fiber(s) 67 and either the first circuit A or the second circuit B, whereof selection is made based on a standard of optical characteristics.

For instance, when the first circuit A meets a standard of optical characteristics, the first circuit A is connected to the fiber array 66 in which the core end face(s) of the tape fiber(s) 67 is(are) arrayed to correspond with the pitch interval of the input/output waveguides at multiplex side 61a and the input/output waveguides at demultiplex side 65a of the first circuit A from the right side of the waveguide substrate 60.

In the same manner, when the second circuit B meets a standard of optical characteristics, the second circuit B is connected to a fiber array (not shown in FIG. 8) in which the core end face(s) of the tape fiber(s) is(are) arrayed to correspond with the pitch interval of the input/output waveguides at multiplex side 61b and the input/output waveguides at demultiplex side 65b of the second circuit B from the left side of the waveguide substrate 60.

As described above, the selection of either the first circuit A or the second circuit B is made depending on whether they meet a standard of optical characteristics. Furthermore, as shown in FIG. 8, when input/output waveguides (61a and 65a, 61b and 65b) for each circuit are formed at both sides of the waveguide substrate 60, and one of the two circuits is selected, only one side of mounting space of the fiber array 67 is to be used.

According to the fifth embodiment of the present invention, the input/output waveguides (61a and 65a, 61b and 65b) of the first circuit A and the second circuit B on one element are formed at opposite sides of the waveguide substrate 60. By using one of the two circuits selected by a standard of optical characteristics, the AWG according to the fifth embodiment of the present invention has less limitation in the mounting position.

Further, according to the fifth embodiment of the present invention, since the first circuit A and the second circuit B form a point symmetry whose point is the element, the shape after construction of the AWG is the same regardless of the selected circuit and both circuits are available.

Sixth Embodiment

Figure 9:
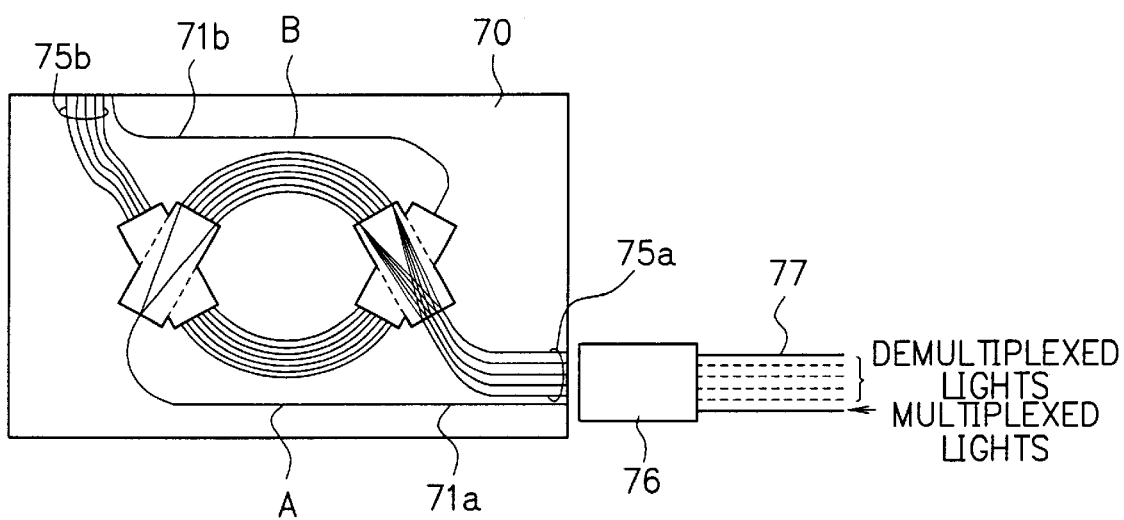
FIG. 9 is a plan view showing a schematic construction of the AWG according to a sixth embodiment of the present invention.

FIG. 9 is a plan view showing a schematic construction of the AWG according to a sixth embodiment of the present invention. As shown in FIG. 9, the AWG according to the sixth embodiment of the present invention comprises a first circuit A and a second circuit B on a waveguide substrate 70 in the same way as the AWG according to the fifth embodiment of the present invention. In this embodiment, core end faces of input/output waveguides at multiplex side 71a and input/output waveguides at demultiplex side 75a of the first circuit A are positioned at the bottom right of the waveguide substrate 70, and core end faces of input/output waveguides at multiplex side 71b and input/output waveguides at demultiplex side 75b of the second circuit B are positioned at the upper left of the waveguide substrate 70.

According to the sixth embodiment of the present invention, a fiber array 76 is used to optically connect a tape fiber(s) 77 and either the first circuit A or the second circuit B, whereof selection is made based on a standard of optical characteristics.

For instance, when the first circuit A meets a standard of optical characteristics, the first circuit A is connected to the fiber array 76 in which the core end face(s) of the tape fiber(s) 77 is(are) arrayed to correspond with the pitch interval of input/output waveguides at multiplex side 71a and the input/output waveguides at demultiplex side 75a of the first circuit A from the right side of the waveguide substrate 70.

In the same manner, when the second circuit B meets a standard of optical characteristics, the second circuit B is connected to a fiber array (not shown in FIG. 9) in which the core end face(s) of the tape fiber(s) is(are) arrayed to correspond with the pitch interval of the input/output waveguides at multiplex side 71b and the input/output waveguides at demultiplex side 75b of the second circuit B from the upper left side of the waveguide substrate 70.

As described above, the selection of either the first circuit A or the second circuit B is made depending on whether they meet a standard of optical characteristics. Furthermore, as shown in FIG. 9, when input/output waveguides (71a and 75a, 71b and 75b) for each circuit are formed at adjacent two sides, that is, the right side and the upper side, of the waveguide substrate 70, and one of the two circuits is selected, only one side of mounting space of the fiber array 77 is to be used.

According to the sixth embodiment of the present invention, the input/output waveguides (71a and 75a, 71b and 75b) of the first circuit A and the second circuit B on one element are formed at adjacent two sides of the waveguide substrate 70. By using one of the two circuits selected by a standard of optical characteristics, the AWG according to the sixth embodiment of the present invention has less limitation in the mounting position.

Seventh Embodiment

Figure 10:
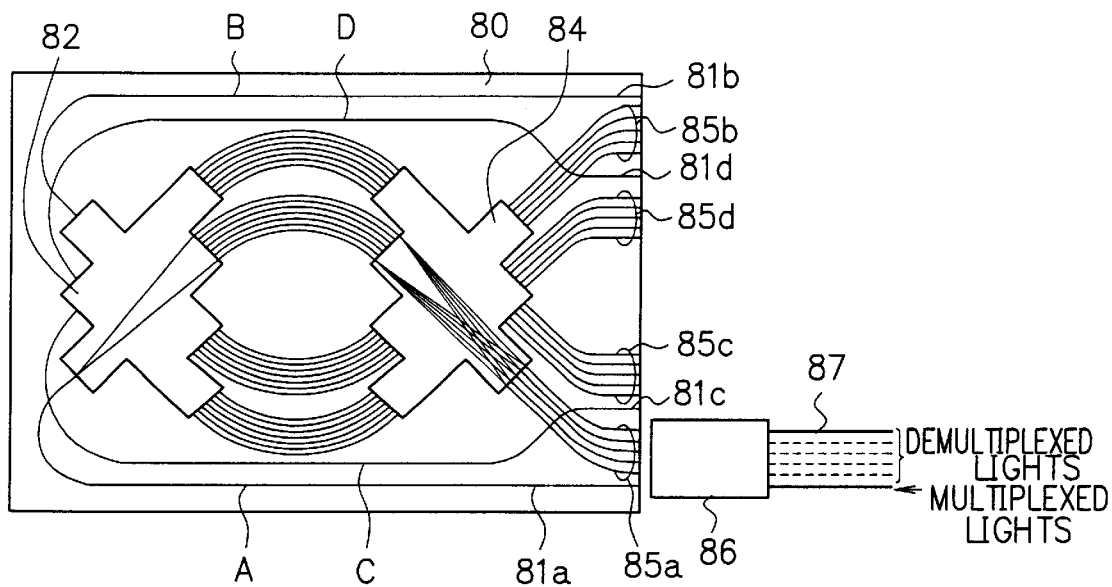
FIG. 10 is a plan view showing a schematic construction of the AWG according to a seventh embodiment of the present invention.

FIG. 10 is a plan view showing a schematic construction of the AWG according to a seventh embodiment of the present invention. As shown in FIG. 10, the AWG according to the seventh embodiment of the present invention comprises a first circuit A, a second circuit B, a third circuit C and a fourth circuit D on a waveguide substrate 80.

The AWG according to the seventh embodiment of the present invention comprises two sets of the circuit construction, which is same as that of the first embodiment, on one element. In FIG. 10, input/output waveguides at multiplex side (81a, 81b, 81c and 81d) and input/output waveguides at demultiplex side (85a, 85b, 85c and 85d) of the first circuit A, a second circuit B, a third circuit C and a fourth circuit D are formed at the upper right side on the waveguide substrate 80. Further, a slab waveguide at multiplex side 82 and a slab waveguides at demultiplex side 84 are integrated as shown in FIG. 10.

According to the seventh embodiment of the present invention, a fiber array 86 is used to optically connect a tape fiber 87 and one of the circuits A to D, whereof selection is made based on a standard of optical characteristics.

For instance, when the first circuit A meets a standard of optical characteristics, the first circuit A is connected to the fiber array 86 in which the core end face(s) of the tape fiber(s) 87 is(are) arrayed to correspond with the pitch interval of the input/output waveguides at multiplex side 81a and the input/output waveguides at demultiplex side 85a of the first circuit A from the right side of the waveguide substrate 80.

In the same manner, when the fourth circuit D meets a standard of optical characteristics, the fourth circuit D is connected to a fiber array (not shown in FIG. 10) in which the core end face(s) of the tape fiber(s) is(are) arrayed to correspond with the pitch interval of the input/output waveguides at multiplex side 8 id and the input/output waveguides at demultiplex side 85d of the fourth circuit D from the right side of the waveguide substrate 80.

Preferably, intersection of the input/output waveguides at multiplex side 81c and the input/output waveguides at demultiplex side 85a, and intersection of the input/output waveguides at multiplex side 81d and the input/output waveguides at demultiplex side 85b, are to be made at an appropriate angle so that loss by light leakage can be avoided. For example, cross angle of about 30 degrees is desirable.

In the same manner, it is preferable that intersection of the input/output waveguides at multiplex side 81a and the input/output waveguides at multiplex side 81c, and intersection of the input/output waveguides at multiplex side 81b and the input/output waveguides at multiplex side 81d, are to be made at an angle of about 30 degrees so that loss by light leakage can be avoided.

According to the seventh embodiment of the present invention, the input/output waveguides at multiplex side and the input/output waveguides at demultiplex side of each circuit can be formed all together at an arbitrary side of the waveguide substrate, and thus only one terminal is required for the fiber array. Thereby the module itself is miniaturized, the mounting area is to be reduced and there is less limitation in the mounting position.

Further, according to the seventh embodiment of the present invention, since four circuits are formed within one device, non-defective ratio is considerably improved.

In addition, according to the seventh embodiment of the present invention, when more than one circuit out of the circuits A to D, which are constructed on one element, meet a standard of optical characteristics, the circuits are to be used at the same time by providing additional fiber array(s) for the available circuits.

Furthermore, according to the seventh embodiment of the present invention, since a plurality of fiber arrays can be extended from one side of a waveguide substrate, only the mounting space for extending the fiber array corresponding to one module is required, and thus the mounting space can be reduced.

Eighth Embodiment

Figure 11:
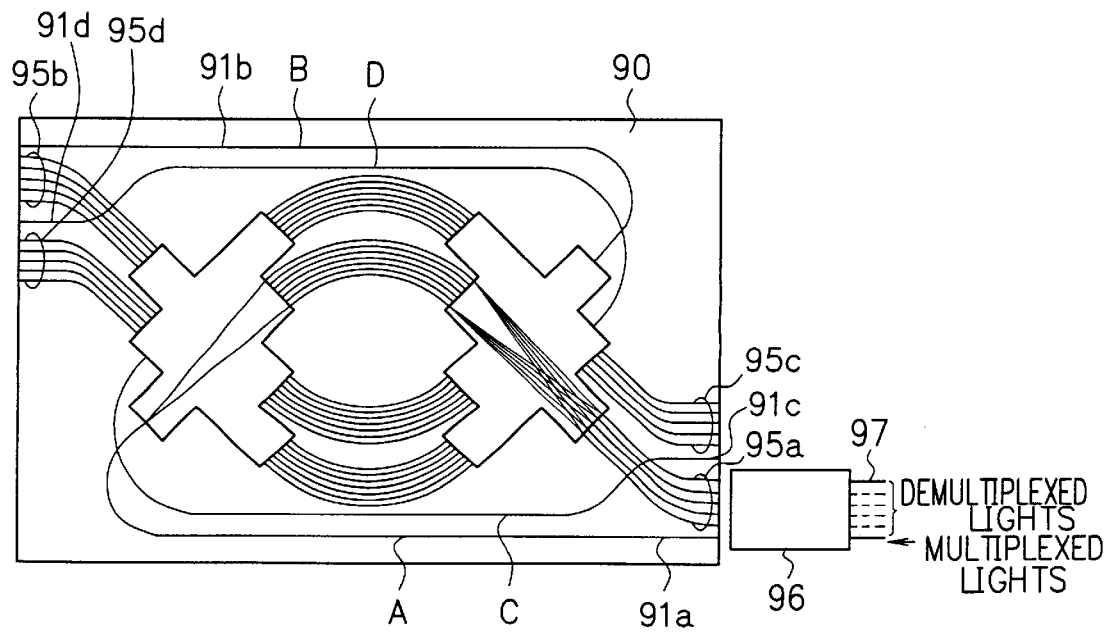
FIG. 11 is a plan view showing a schematic construction of the AWG according to a eighth embodiment of the present invention.

FIG. 11 is a plan view showing a schematic construction of the AWG according to a eighth embodiment of the present invention. As shown in FIG. 11, the AWG according to the eighth embodiment of the present invention comprises a first circuit A, a second circuit B, a third circuit C and a fourth circuit D on a waveguide substrate 90 in the same way as the AWG according to the seventh embodiment of the present invention. In this embodiment, core end faces of input/output waveguides at multiplex side 91a and input/output waveguides at demultiplex side 95a of the first circuit A, and input/output waveguides at multiplex side 91c and input/output waveguides at demultiplex side 95c of the third circuit C are positioned at the bottom right of the waveguide substrate 90, and core end faces of input/output waveguides at multiplex side 91b and input/output waveguides at demultiplex side 95b of the second circuit B, and input/output waveguides at multiplex side 91d and input/output waveguides at demultiplex side 95d of the fourth circuit D are positioned at the upper left of the waveguide substrate 90.

According to the eighth embodiment of the present invention, a fiber array 96 is used to optically connect a tape fiber 97 and one of four circuits A to D, whereof selection is made based on a standard of optical characteristics.

For instance, in FIG. 11 when the first circuit A meets a standard of optical characteristics, the first circuit A is connected to the fiber array 96 in which the core end face(s) of the tape fiber(s) 97 is(are) arrayed to correspond with the pitch interval of the input/output waveguides at multiplex side 91a and the input/output waveguides at demultiplex side 95a of the first circuit A from the bottom right of the waveguide substrate 90.

As described above, the selection of four circuits A to D is made depending on whether they meets a standard of optical characteristics. Thus, as shown in FIG. 11, when input/output waveguides (91a and 95a, 91b and 95b, 91c and 95c, 91d and 95d) for each circuit are formed at both sides of the waveguide substrate 90, and one of the four circuits is selected and used, only one side of mounting space of the fiber array 97 is to be used.

Preferably, intersection of the input/output waveguides at multiplex side 91c and the input/output waveguides at demultiplex side 95a, and intersection of the input/output waveguides at multiplex side 91d and the input/output waveguides at demultiplex side 95b, are to be made at an appropriate angle so that loss by optical leakage can be avoided. For example, cross angle of about 30 degrees is preferred.

In the same manner, it is preferable that intersection of the input/output waveguides at multiplex side 91a and the input/output waveguides at multiplex side 91c, and intersection of the input/output waveguides at multiplex side 91b and the input/output waveguides at multiplex side 91d, are to be made at an angle of about 30 degrees so that loss by optical leakage can be avoided.

According to the eighth embodiment of the present invention, the input/output waveguides of the first circuit A and the third circuit C (91a, 95a, 91c and 95c), and the input/output waveguides of the second circuit B and the fourth circuit D (91b, 95b, 91d and 95d) are formed on one element, and the core end faces are formed at opposite two sides of the waveguide substrate 90. By using one of the four circuits selected by a standard of optical characteristics, the AWG according to the eighth embodiment of the present invention has less limitation in the mounting position. As a result, it is made possible to mount the AWG on such places as a triangular corner and a blind alley.

Further, according to the eighth embodiment of the present invention, since four circuits are formed within one element, non-defective ratio is considerably improved.

In addition, according to the eighth embodiment of the present invention, when more than one circuit out of the first circuit A to the fourth circuit D, which are constructed on one element, meet a standard of optical characteristics, the circuits are to be used at the same time by providing additional fiber array(s) for the available circuits.

Ninth Embodiment

Figure 12:
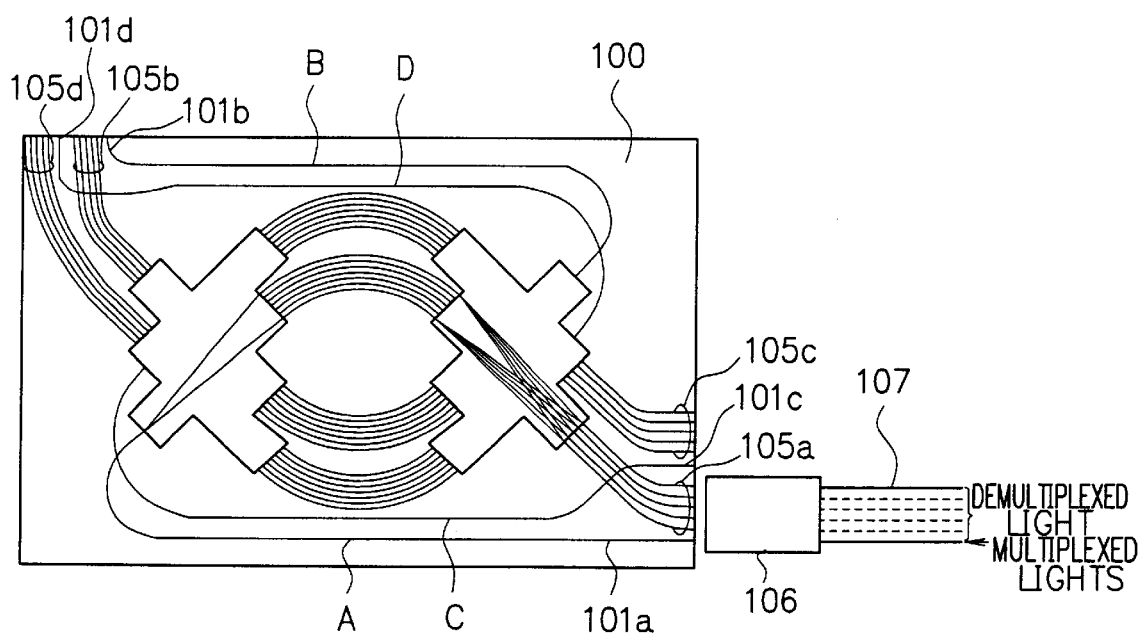
FIG. 12 is a plan view showing a schematic construction of the AWG according to a ninth embodiment of the present invention.

FIG. 12 is a plan view showing a schematic construction of the AWG according to a ninth embodiment of the present invention. As shown in FIG. 12, the AWG according to the ninth embodiment of the present invention comprises a first circuit A, a second circuit B, a third circuit C and a fourth circuit D on a waveguide substrate 100 in the same way as the AWG according to the seventh and the eighth embodiments of the present invention. In this embodiment, core end faces of input/output waveguides at multiplex side 101a and input/output waveguides at demultiplex side 105a of the first circuit A, and input/output waveguides at multiplex side 101c and input/output waveguides at demultiplex side 105c of the third circuit C are positioned at the bottom right of the waveguide substrate 100, and core end faces of input/output waveguides at multiplex side 101b and input/output waveguides at demultiplex side 105b of the second circuit B, and input/output waveguides at multiplex side 101d and input/output waveguides at demultiplex side 105d of the fourth circuit D are positioned at the upper left of the waveguide substrate 100.

According to the ninth embodiment of the present invention, a fiber array 106 is used to optically connect a tape fiber 107 and one of four circuits A to D, whereof selection is made based on a standard of optical characteristics.

For instance, in FIG. 12 when the first circuit A meets a standard of optical characteristics, the first circuit A is connected to the fiber array 106 in which the core end face(s) of the tape fiber(s) 107 is(are) arrayed to correspond with the pitch interval of the input/output waveguides at multiplex side 101a and the input/output waveguides at demultiplex side 105a of the first circuit A from the bottom right side of the waveguide substrate 100.

In the same manner, when the fourth circuit D meets a standard of optical characteristics, the fourth circuit D is connected to a fiber array (not shown in FIG. 12) in which the core end faces of the tape fiber(s) is(are) arrayed to correspond with the pitch interval of the input/output waveguides at multiplex side 101d and the input/output waveguides at demultiplex side 105d of the fourth circuit D from the upper left side of the waveguide substrate 100.

As described above, the selection of four circuits A to D is made depending on whether they meet a standard of optical characteristics. Thus, as shown in FIG. 12, when input/output waveguides (101a and 105a, 101b and 105b, 101c and 105c and 101d and 105d) for each circuit are formed at adjacent two sides, that is, the right side and the upper side of the waveguide substrate 100, and one of the four circuits is selected, only one side of mounting space of the fiber array 107 is to be used.

Preferably, intersection of the input/output waveguides at multiplex side 101c and the input/output waveguides at demultiplex side 105a, and intersection of the input/output waveguides at multiplex side 101d and the input/output waveguides at demultiplex side 105b, are to be made at an appropriate angle so that loss by optical leakage can be avoided. For example, cross angle of about 30 degrees is preferred.

In the same manner, it is preferable that intersection of the input/output waveguides at multiplex side 101a and the input/output waveguides at multiplex side 101c, and intersection of the input/output waveguides at multiplex side 101b and the input/output waveguides at multiplex side 101d, are to be made at an angle of about 30 degrees so that loss by optical leakage can be avoided.

According to the ninth embodiment of the present invention, the input/output waveguides of the first circuit A and the third circuit C (101a and 105a, and 101c and 105c), and the input/output waveguides of the second circuit B and the fourth circuit D (101b and 105b, and 101d and 105d) are formed on one element, and core end faces of which are formed at adjacent two sides of the waveguide substrate 100. By using one of the four circuits selected by a standard of optical characteristics, the AWG according to the ninth embodiment of the present invention has less limitation in the mounting position.

Further, according to the ninth embodiment of the present invention, since four circuits are formed within one element, non-defective ratio is considerably improved.

In addition, according to the ninth embodiment of the present invention, when more than one circuit out of the first circuit A to the fourth circuit D on one waveguide substrate meet a standard of optical characteristics, the circuits are to be used at the same time by providing additional fiber array(s) for the available circuits, and there is less limitation in the mounting position.

Still further, in each of the above-mentioned preferred embodiments, the AWG element can be composed of, in addition to vitreous body such as a waveguide with quartz, crystalline such as LN ($LiNbO_3$), amorphous such as Si, semiconductor such as InP or organic materials such as polyimide. Mainly CVD (chemical vapor deposition) method or FHD (flame hydrolysis deposition) method is applied to a quartz-type waveguide. For instance, when an AWG is constructed by semiconductor such as InP, microminiaturization can be realized, and when constructed by organic materials such as polyimide, the price can be lowered.

Figure 13:
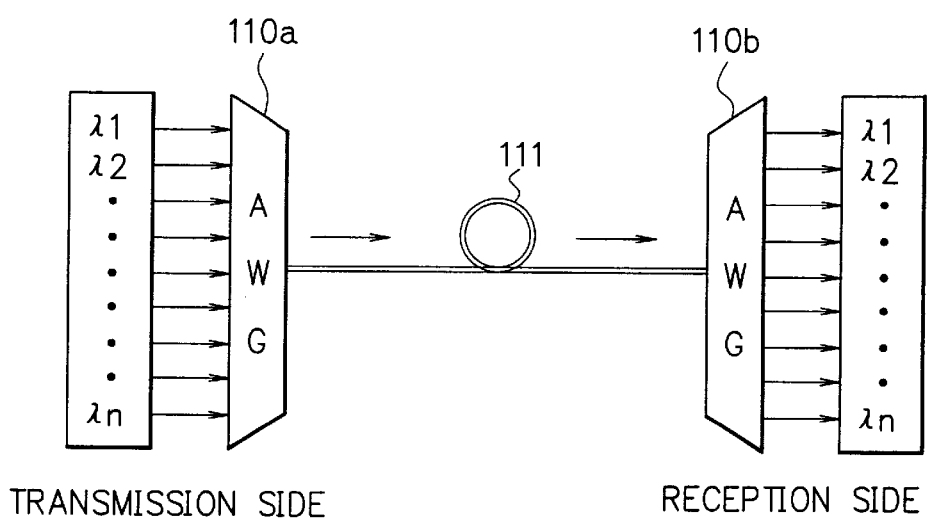
FIG. 13 is a configuration showing a schematic view of an optical communication system provided with the AWG according to each embodiment of the present invention.

FIG. 13 is a configuration showing a schematic view of an optical communication system provided with the AWG according to each embodiment of the present invention. As shown in FIG. 13, optical wavelengths $\lambda_1$ to $\lambda n$ inputted from transmission side are multiplexed by an AWG 110a according to each embodiment, passing an optical fiber cable 111, and then transmitted to reception side.

The multiplexed lights transmitted via the optical fiber cable 111 are demultiplexed according to each wavelength by an AWG 110b on reception side and receive each of the demultiplexed lights $\lambda_1$ to $\lambda n$.

Also, the above-mentioned AWG can be used as an optical communication device including an optical multiplexer/demultiplexer, an optical add-drop multiplexer and a wavelength switching device.

According to the first and the second embodiments of the present invention, only one terminal is required for an input/output fiber array. Thus, since the mounting space for a fiber array with two terminals within the module is not required as the conventional module structure, miniaturization of the module itself is realized, and the mounting space is considerably to be reduced.

Still further, since an input/output fiber array and a tape fiber are positioned at an arbitrary side, there is less limitation in deciding the mounting position. As a result, it is made possible to mount the AWG on such places as a triangular corner and a blind alley.

In addition, since only one fiber array is required, the number of parts can be reduced, at the same time, since an element can select one of the two circuits, which has better optical characteristics, non-defective ratio can be doubled and the unit price of the element is lowered.

While the present invention has been described with reference to the particular illustrative embodiments, it is not to be restricted by these embodiments but only by the appended claims. It is to be appreciated that those skilled in the art can change or modify the embodiments without departing from the spirit and scope of the present invention.

What is claimed is:

1. An arrayed waveguide grating comprising: a first arrayed waveguide grating circuit and a second arrayed waveguide grating circuit on a substrate, each of said arrayed waveguide grating circuits comprising:
   input waveguides;
   output waveguides;
   arrayed waveguides; and
   slab waveguides,
   wherein said slab waveguides of said first arrayed waveguide grating circuit and said second arrayed waveguide grating circuit are shared mutually on said substrate.

2. The arrayed waveguide grating of claim 1, wherein input ends and output ends of one of said arrayed waveguide grating circuits are positioned on one side of said substrate.

3. The arrayed waveguide grating of claim 2, wherein input ends and output ends of another of said arrayed waveguide grating circuits are positioned on another side of said substrate.

4. An arrayed waveguide grating comprising:
   a plurality of arrayed waveguide grating circuits on a substrate, wherein said arrayed waveguide grating circuits are provided with a first circuit and a second circuit, and said first circuit comprising:
   first input/output waveguides at a multiplexing side on said substrate;
   a first slab waveguide at said multiplexing side on said substrate;
   second input/output waveguides at a demultiplexing side on said substrate;
   a second slab waveguide at said demultiplexing side on said substrate; and
   a first arrayed waveguide group connecting said first slab waveguide and said second slab waveguide on said substrate.

5. An optical communication system employing the arrayed waveguide grating claimed in claim 4.

6. An optical multiplexer/demultiplexer employing the arrayed waveguide grating claimed in claim 4.

7. An arrayed waveguide grating comprising a plurality of arrayed waveguide grating circuits on a substrate, wherein said circuits are provided with a first circuit and a second circuit, and said first circuit comprising:
   first input/output waveguides at a multiplexing side on said substrate;
   a first slab waveguide at said multiplexing side on said substrate;
   second input/output waveguides at a demultiplexing side on said substrate;
   a second slab waveguide at said demultiplexing side on said substrate; and
   a first arrayed waveguide group connecting said first slab waveguide and said second slab waveguide on said substrate, and said second circuit comprising:
   third input/output waveguides at a multiplexing side on said substrate;
   a third slab waveguide at said multiplexing side on said substrate;
   fourth input/output waveguides at a demultiplexing side on said substrate;
   a fourth slab waveguide at said demultiplexing side on said substrate; and
   a second arrayed waveguide group connecting said third slab waveguide and said fourth slab waveguide on said substrate.

8. The arrayed waveguide grating as claimed in claim 7, wherein said first slab waveguide and said third slab waveguide are intersected on said substrate, and said second slab waveguide and said fourth slab waveguide are intersected on said substrate.

9. The arrayed waveguide grating as claimed in claim 7, wherein a cross-point of said first slab waveguide and said third slab waveguide and a cross-point of said second slab waveguide and said fourth slab waveguide are positioned on said substrate, and the two cross-points form a line symmetry whose axis is the line segment combining the central points of said first arrayed waveguide group and said second arrayed waveguide group.

10. The arrayed waveguide grating as claimed in claim 7, wherein the ends of said first input/output waveguides and said second input/output waveguides are positioned at one side of said substrate, and the ends of said third input/output waveguides and said fourth input/output waveguides are positioned at one side of said substrate.

11. The arrayed waveguide grating as claimed in claim 7, wherein said first slab waveguide intersects one of said third and fourth slab waveguides and said second slab waveguide intersects the other one of said third and fourth slab waveguides.

12. The arrayed waveguide grating as claimed in claim 11, wherein the cross-points of said slab waveguides are symmetrically positioned.

13. An optical communication system employing the arrayed waveguide grating claimed in claim 7.

14. An optical multiplexer/demultiplexer employing the arrayed waveguide grating claimed in claim 7.

15. An arrayed waveguide grating comprising a plurality of arrayed waveguide grating circuits on a substrate, wherein input ends and output ends of one of said arrayed waveguide grating circuits are positioned at one side of said substrate, and are provided with a first circuit and a second circuit, and said first circuit comprising:
   first input/output waveguides at a multiplexing side on said substrate;

a first slab waveguide at said multiplexing side on said substrate;

second input/output waveguides at a demultiplexing side on said substrate;

a second slab waveguide at said demultiplexing side on said substrate; and a first arrayed waveguide group connecting said first slab waveguide and said second slab waveguide on said substrate.

16. An optical communication system employing the arrayed waveguide grating claimed in claim 15.

17. An optical multiplexer/demultiplexer employing the arrayed waveguide grating claimed in claim 15.

18. An arrayed waveguide grating comprising a plurality of arrayed waveguide grating circuits on a substrate, wherein input ends and output ends of one of said arrayed waveguide grating circuits are positioned at one side of said substrate, and each of said plurality of arrayed waveguide grating circuits are provided with a first circuit and a second circuit, and said first circuit comprising:

first input/output waveguides at a multiplexing side on said substrate;

a first slab waveguide at said multiplexing side on said substrate;

second input/output waveguides at a demultiplexing side on said substrate;

a second slab waveguide at said demultiplexing side on said substrate; and a first arrayed waveguide group connecting said first slab waveguide and said second slab waveguide on said substrate and said second circuit comprising:

third input/output waveguides at a multiplexing side on said substrate;

a third slab waveguide at said multiplexing side on said substrate;

fourth input/output waveguides at a demultiplexing side on said substrate;

a fourth slab waveguide at said demultiplexing side on said substrate; and a second arrayed waveguide group connecting said third slab waveguide and said fourth slab waveguide on said substrate.

19. The arrayed waveguide grating as claimed in claim 18, wherein said first slab waveguide and said third slab waveguide are intersected on said substrate, and said second slab waveguide and said fourth slab waveguide are intersected on said substrate.

20. The arrayed waveguide grating as claimed in claim 18, wherein a cross-point of said first slab waveguide and said third slab waveguide and a cross-point of said second slab waveguide and said fourth slab waveguide are positioned on said substrate, and the two cross-points form a line symmetry whose axis is the line segment combining the central points of said first arrayed waveguide group and said second arrayed waveguide group.

21. The arrayed waveguide grating as claimed in claim 18, wherein said input ends and output ends of said circuits comprise ends of said first input/output waveguides, said second input/output waveguides, said third input/output waveguides and said fourth input/output waveguides at one side of said substrate.

22. The arrayed waveguide grating as claimed in claim 18, wherein said first slab wave guide intersects one of said third and fourth slab waveguides and said second slab waveguide intersects the other one of said third and fourth slab waveguides.

23. The arrayed waveguide grating as claimed in claim 22, wherein the cross-points of said slab waveguides are symmetrically positioned.

24. An optical communication system employing the arrayed waveguide grating claimed in claim 18.

25. An optical multiplexer/demultiplexer employing the arrayed waveguide grating claimed in claim 18.

26. An arrayed waveguide grating comprising a plurality of arrayed waveguide grating circuits on a substrate, wherein input ends and output ends of one of said arrayed waveguide grating circuits are positioned at one side of said substrate and input ends and output ends of another of said arrayed waveguide grating circuits are positioned at one side of said substrate, and are provided with a first circuit and a second circuit, and said first circuit comprising:

first input/output waveguides at a multiplexing side on said substrate;

a first slab waveguide at said multiplexing side on said substrate;

second input/output waveguides at a demultiplexing side on said substrate;

a second slab waveguide at said demultiplexing side on said substrate; and a first arrayed waveguide group connecting said first slab waveguide and said second slab waveguide on said substrate.

27. An optical communication system employing the arrayed waveguide grating claimed in claim 26.

28. An optical multiplexer/demultiplexer employing the arrayed waveguide grating claimed in claim 26.

29. An arrayed waveguide grating comprising a plurality of arrayed waveguide grating circuits on a substrate, wherein input ends and output ends of one of said arrayed waveguide grating circuits are positioned at one side of said substrate and input ends and output ends of another of said arrayed wave guide grating circuits are positioned at one side of said substrate, and are provided with a first circuit and a second circuit, and said first circuit comprising:

first input/output waveguides at a multiplexing side on said substrate;

a first slab waveguide at said multiplexing side on said substrate;

second input/output waveguides at a demultiplexing side on said substrate;

a second slab waveguide at said demultiplexing side on said substrate; and a first arrayed waveguide group connecting said first slab waveguide and said second slab waveguide on said substrate, and said second circuit comprising:

third input/output waveguides at a multiplexing side on said substrate;

a third slab waveguide at said multiplexing side on said substrate;

fourth input/output waveguides at a demultiplexing side on said substrate;

a fourth slab waveguide at said demultiplexing side on said substrate; and a second arrayed waveguide group connecting said third slab waveguide and said fourth slab waveguide on said substrate.

30. The arrayed waveguide grating as claimed in claim 29, wherein said first slab waveguide and said third slab waveguide are intersected on said substrate, and said second slab waveguide and said fourth slab waveguide are intersected on said substrate.

31. The arrayed waveguide grating as claimed in claim 29, wherein a cross-point of said first slab waveguide and said third slab waveguide and a cross-point of said second slab waveguide and said fourth slab waveguide are positioned on said substrate, and the two cross-points form a line symmetry whose axis is the line segment combining the central points of said first arrayed waveguide group and said second arrayed waveguide group.

32. The arrayed waveguide grating as claimed in claim 29, wherein said input ends and output ends of said circuits comprise ends of said first input/output waveguides, said second input/output waveguides, said third input/output waveguides and said fourth input/output waveguides at one side of said substrate.

33. The arrayed waveguide grating as claimed in claim 29, wherein said first slab waveguide intersects one of said third and fourth slab waveguides and said second slab waveguide intersects the other one of said third and fourth slab waveguides.

34. The arrayed waveguide grating as claimed in claim 33, wherein the cross-points of said slab waveguides are symmetrically positioned.

35. An optical communication system employing the arrayed waveguide grating claimed in claim 29.

36. An optical multiplexer/demultiplexer employing the arrayed waveguide grating claimed in claim 29.

* * * * *